United States Patent
Kometani et al.

(10) Patent No.: US 6,755,991 B2
(45) Date of Patent: Jun. 29, 2004

(54) AROMATIC DICARBOXYLIC ACID COMPOSITION AND LIQUID CRYSTALLINE POLYESTER RESIN MADE FROM THE SAME

(75) Inventors: Kiichi Kometani, Ikeda (JP); Hiroyuki Kato, Kawanishi (JP); Kazunori Ueda, Takarazuka (JP)

(73) Assignee: Kabushiki Kaisha Ueno Seiyaku Oyo Kenkyujo, Osaka-fu (JP)

( * ) Notice: Subject to any disclaimer, the term of this patent is extended or adjusted under 35 U.S.C. 154(b) by 227 days.

(21) Appl. No.: 09/917,209

(22) Filed: Jul. 30, 2001

(65) Prior Publication Data

US 2002/0045728 A1 Apr. 18, 2002

(30) Foreign Application Priority Data

Jul. 28, 2000 (JP) ........................................ 2000/228910

(51) Int. Cl.$^7$ .............................................. C09K 19/52
(52) U.S. Cl. ............................ 252/299.01; 252/299.67; 252/299.64; 252/299.62
(58) Field of Search ................... 252/299.01, 299.6, 252/299.61, 299.62, 299.63, 299.64, 299.65, 299.66, 299.67, 299.68; 428/1.1

(56) References Cited

U.S. PATENT DOCUMENTS

| 4,390,681 | A | * | 6/1983 | Deex | ........................... 528/193 |
| 4,942,087 | A | * | 7/1990 | Motooka et al. | ............. 428/332 |
| 5,543,474 | A | * | 8/1996 | Kawaki | ....................... 525/440 |
| 5,843,541 | A | * | 12/1998 | Alanko et al. | .............. 428/35.7 |
| 6,258,921 | B1 | * | 7/2001 | Park et al. | ................... 528/193 |
| 6,296,930 | B1 | * | 10/2001 | Ohbe et al. | ............... 428/304.4 |

FOREIGN PATENT DOCUMENTS

| EP | 0 283 273 | * | 9/1988 | ........... G11B/5/704 |
| JP | 61-043654 | * | 3/1986 | ........... C08L/67/02 |
| JP | 07-070331 | * | 3/1995 | .............. C08J/3/16 |

OTHER PUBLICATIONS

*Translation supplied **translation of abstract only supplied.*

* cited by examiner

Primary Examiner—Mark F. Huff
Assistant Examiner—Jennifer R. Sadula
(74) Attorney, Agent, or Firm—Sughrue Mion, PLLC

(57) ABSTRACT

An aromatic dicarboxylic acid composition, essentially consisting of (a) at least one aromatic dicarboxylic acid; (b) 1–3000 ppm of at least one compound selected from the group consisting of 6-formyl-2-naphthoic acid, 6-methoxycarbonyl-2-naphthoic acid and trimellitic acid; (c) 1–1000 ppm of at least one alkali metal and (d) 0–3000 ppm of at least one transition metal is provided. By employing the composition in manufacturing liquid crystalline polyester, LPCs with good coloring property and improved heat resistance as well as excellent mechanical property can be obtained. The present invention also provides a liquid crystalline polyester resin prepared by using the composition.

15 Claims, No Drawings

AROMATIC DICARBOXYLIC ACID COMPOSITION AND LIQUID CRYSTALLINE POLYESTER RESIN MADE FROM THE SAME

BACKGROUND OF THE INVENTION

The present invention relates to an aromatic dicarboxylic acid composition and a liquid crystalline polyester resin made from the same.

Thermotropic liquid crystalline polyester resins (hereafter, referred as liquid crystalline polyesters or LCPs) are excellent in mechanical properties such as heat resistance and stiffness, chemical resistance and dimensional accuracy. The LCPs are used not only for molded products but also for variety of products including fibers and films. For example, parts used in personal computers and mobile phones are highly integrated and the art wishes to use downsized, thinner and smaller parts. In this field, very thin parts, as thin as 0.5 mm or less of the thickness are sometimes required. Based on the excellent molding properties of the LCPs including good flowability and less flash and warpage development compared to the other thermoplastic resins, consumption of the LCPs has been increasing.

Meanwhile, liquid crystalline polyesters still leave much to be improved in their flowability, heat resistance, and mechanical properties and a variety of proposals have been made. For example, WO 94/29366 discloses a liquid crystalline polyester resin having improved heat resistance prepared by adding alkali metal into certain monomers and polymerizing the same.

However, when colored with a colorant such as carbon black or azo pigment, it is difficult to obtain uniformly colored LCP product. Therefore, application of said LCPs in the field, where uniform solid color or clear color development is required, has been limited.

An object of the present invention is to provide a liquid crystalline polyester resin having an improved heat resistance and good mechanical properties as well as good colorability.

Another object of the present invention is to provide an aromatic dicarboxylic acid composition useful for preparing a liquid crystalline polyester resin having an improved heat resistance and good mechanical properties as well as good coloring properties.

SUMMARY OF THE INVENTION

The present invention relates to a composition essentially consisting of;

(a) at least one aromatic dicarboxylic acid, (b) 1–3000 ppm of at least one compound selected from the group consisting of 6-formyl-2-naphthoic acid, 6-methoxycarbonyl-2-naphthoic acid and trimellitic acid (c) 1–1000 ppm of at least one alkaline metal, and (d) 0–3000 ppm of at least one transition metal.

The composition of the present invention is used for preparing thermotropic liquid crystalline polyester resin. The liquid crystalline polyester resin prepared from the aromatic dicarboxylic acid composition and LCP constituting monomers other than the aromatic dicarboxylic acid is excellent in coloring property and has improved heat resistance as well as good mechanical properties.

The present invention also provides a liquid crystalline polyester resin comprising;

(a) at least one repeat unit derived from an aromatic dicarboxylic acid, (b) at least one monomer unit derived from a compound selected from the group consisting of 6-formyl-2-naphthoic acid, 6-methoxycarbonyl-2-naphthoic acid and trimellitic acid in an amount of 0.1–100 mmol % based on the total monomer units constituting the polyester; and (c) 1–100 ppm of at least one alkali metal compound.

The liquid crystalline polyester resin of the present invention may further comprise 1–300 ppm of at least one transition metal.

The liquid crystalline polyester resin of the present invention may be prepared by polymerizing the aromatic dicarboxylic acid composition of the present invention and LCP constituting monomers other than the aromatic dicarboxylic acid. Alternatively, the LCP resin of the present invention may be prepared by mixing LCP constituting monomers with the above-described additives so that the ratio of the additives are in the defined range, and polymerizing the same. Irrespective of the starting material, the liquid crystalline polyester resin comprising the above-defined components in above-defined ranges is encompassed by the present invention.

DETAILED DESCRIPTION OF THE INVENTION

The aromatic dicarboxylic acid composition of the present invention comprises 1–3000 ppm, preferably 5–2500 ppm and more preferably 10–2000 ppm of at least one compound selected from the group consisting of 6-formyl-2-naphthoic acid, 6-methoxycarbonyl-2-naphthoic acid and trimellitic acid.

6-formyl-2-naphthoic acid can be prepared from 6-methoxycarbonyl-2-naphthoic acid by reducing the carboxyl group according to the conventional manner to give formyl group, then hydrolyzing the other methyl ester and purifying the product.

6-methoxycarbonyl-2-naphthoic acid may be prepared from 2,6-naphthalene dicarboxylic acid by dissolving the same in a solvent such as N,N-dimethylformamide, reacting the same with stoichiometrically equal amount of methyl iodide or the like under the presence of potassium carbonate or the like and purifying the reaction product.

Trimellitic acid is commercially available.

The aromatic dicarboxylic acid composition of the present invention comprises 1–1000 ppm, preferably 2–500 ppm and more preferably, 5–300 ppm of at least one alkali metal.

According to the present invention, examples of alkali metals include lithium, sodium, potassium, cesium and rubidium. Preferably, the alkali metal may be sodium, potassium or a mixture thereof, and more preferably potassium.

The aromatic dicarboxylic acid composition of the present invention may further comprise 1–3000 ppm, preferably 1–2000 ppm and more preferably 2–1000 ppm of at least one transition metal.

Examples of transition metals include cobalt, manganese, iron, zinc, nickel and copper. Among the above, cobalt, manganese and iron, and especially, cobalt and manganese are preferable.

Both of the alkali metals and the transition metals may be added to and present in the aromatic dicarboxylic acid composition or the LCP resin of the present invention in the form of compounds such as salts thereof. The metal itself may be present in the form of its cation. Examples of salts include sulfate, carbonate, bicarbonate, nitrate, carboxylate, and halogenate of the alkali metal or the transition metal. Among the above, carboxylate, sulfate and carbonate are preferable. As for carboxylates, salts of aliphatic carboxylic acid having 2–6 carbon atoms and of carboxylic acid which can be incorporated into the LCP as a monomer unit constituting the same are preferable. For example, acetate, 4-hydroxy benzoate, 6-formyl-2-naphthoate, 6-methoxycarbonyl-2-naphthoate, trimellitate, 2-hydroxy-6-naphthoate and salts of other polymerizable monomers from which aromatic carbonyl repeat units can be derived are preferably used.

The volume mean diameters of both of the alkali metal salts and the transition metal salts added to or incorporated in the aromatic dicarboxylic acid composition or the LCP of the present invention may be in the range of 0.01–500 $\mu$m, preferably, 0.05–150 $\mu$m.

According to the present invention, the aromatic dicarboxylic acid may be in the form of its alkyl, alkoxy or halogenated derivatives as well as their ester forming derivatives. Examples of aromatic dicarboxylic acids and their derivatives include terephthalic acid, isophthalic acid, 2,6-naphthalenedicarboxylic acid, 1,6-naphthalenedicarboxylic acid, 2,7-naphthalene dicarboxylic acid, 4,4'-diphenyldicarboxylic acid, bis(4-carboxyphenyl) ether, bis(4-carboxyphenoxy)butane, bis(4-carboxyphenyl) ethane, bis(3-carboxyphenyl)ether and bis(3-carboxyphenyl) ethane. Among the above, terephthalic acid and 2,6-naphthalene dicarboxylic acid, especially, 2,6-naphthalene dicarboxylic acid are preferable.

The method to prepare the aromatic dicarboxylic acid composition of the present invention is not limited. For example, the aromatic dicarboxylic acid may be prepared by, admixing the above-defined amount of components to at least one aromatic dicarboxylic acid and mixing the same uniformly.

The present invention further provides a liquid crystalline polyester resin comprising
 (a) at least one repeat unit derived from an aromatic dicarboxylic acid;
 (b) at least one monomer unit derived from a compound selected from the group consisting of 6-formyl-2-naphthoic acid, 6-methoxycarbonyl-2-naphthoic acid and trimellitic acid in an amount of 0.1–100 mmol % based on the total monomer units constituting the polyester; and
 (c) 1–100 ppm of at least one alkali metal compound.

The liquid crystalline polyester resin of the present invention may be prepared by polymerizing LCP constituting monomers which comprises the aromatic dicarboxylic acid composition of the present invention instead of the aromatic dicarboxylic acid itself.

The liquid crystalline polyester resin of the present invention exhibits anisotropic melt phase. The anisotropic melt phase can be confirmed by means of conventional polarized light system using orthogonal light polarizer. In more detail, the sample on the Leitz's hot stage under nitrogen atmosphere may be observed with Leitz's polarization microscope at 40-magunification. When a sample is optically anisotropic, the sample transmit polarized light even under static state.

The liquid crystalline polyester resin of the present invention may be polyester or polyester amide resin composition which exhibits anisotropic melt phase. The LCP composition is constituted of monomer units, in addition to those derived from aromatic dicarboxylic acid, those derived from the group consisting of aromatic hydroxy carboxylic acids, aromatic diols, aromatic hydroxy amines, aromatic diamines and aromatic amino carboxylic acids, especially, those selected from aromatic diols and aromatic hydroxy carboxylic acids.

As for aromatic dicarboxylic acid monomers, any of those above described aromatic dicarboxylic acid may preferably be employed.

Examples of aromatic hydroxy carboxylic acids include, for example, 4-hydroxy benzoic acid, 3-hydroxy benzoic acid, 2-hydroxy benzoic acid, 2-hydroxy-6-naphthoic acid, 5-hyxroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid and alkyl, alkoxy and halogen derivatives thereof as well as ester forming derivatives thereof. Among them, 4-hydroxy benzoic acid and 2-hydroxy-6-naphthoic acid are preferable.

Examples of aromatic diols include hydroquinone, resorcin, 2,6-dihydroxynaphthalene, 2,7-dihydroxy naphthalene, 1,6-dihydroxynaphthalene, 4,4'-dihydroxybiphenyl, 3,3'-dihydroxybiphenyl, 3,4'-dihydroxy biphenyl, 4,4'-dihydroxybiphenyl ether, bis (4-hydroxyterphenyl)ethane and alkyl, alkoxy and halogen substituted derivatives thereof as well as ester forming derivatives thereof. Among the above, hydroquinone and 4,4'-dihydroxybiphenyl are preferable.

Examples of aromatic hydroxy amines include 4-aminophenol, N-methyl-4-aminophenol, 3-aminophenol, 3-methyl-4-aminophenol, 4-amino-1-naphthol, 4-amino-4'-hydroxybiphenyl, 4-amino-4'-hydroxybiphenyl ether, 4-amino-4'-hydroxybiphenyl methane, and 4-amino-4'-hydroxybiphenyl sulfide and ester forming derivatives thereof. Examples of aromatic diamines include 1,4-phenylenediamine, N-methyl-1,4-phenylenediamine, N,N'-dimethyl-1,4-phenylenediamine, 4,4'-diaminophenylsulfide (thiodianiline), 2,5-diamino toluene, 4,4'-ethylenedianiline, 4,4'-diaminobiphenoxy ethane, 4,4'-diaminobiphenyl methane (methylene dianiline), 4,4'-diaminobiphenyl ether (oxydianiline), 4,4'-diaminobiphenyl sulfone and ester forming derivatives thereof. Examples of aromatic amino carboxylic acids include 4-aminobenzoic acid, 6-amino-2-naphthoic acid, 7-amino-2-naphthoic acid and ester forming derivatives thereof.

The liquid crystalline polyester resin of the present invention may further comprise other monomer units as long as they do not impair the object of the present invention. The other monomer units may be those derived from compounds selected from the group consisting of alicyclic dicarboxylic acids, aliphatic diols, alicyclic diols, aromatic mercaptocarboxylic acids, aromatic dithiols, aromatic mercaptophenols and a mixture thereof. The total amount of the other monomer units in the liquid crystalline polyester resin of the present invention may preferably be less than 10 mol % of the total amount of aromatic hydroxy carboxylic acids, aromatic dicarboxylic acids and aromatic diols.

Examples of alicyclic dicarboxylic acids include hexahydrotelephthalic acid and its ester forming derivatives. Examples of alicyclic diols include trans-1,4-cyclohexanediol, cis-1,4-cycrohexanediol, trans-1,4-cyclohexanedimethanol, cis-1,4-cyclohexane dimethanol, trans-1,3-cyclohexanediol, cis-1,2-cyclohexanediol, trans-1, 3-cyclohexanedimethanol and ester forming derivatives thereof. Examples of linear or branched chain aliphatic diols include ethylene glycol, 1,3-propanediol, 1,4-butanediol, neopentylglycol and ester forming derivatives thereof.

Examples of aromatic mercaptocarboxylic acids include 4-mercaptobenzoic acid, 2-mercapto-6-naphthoic acid, 2-mercapto-7-naphthoic acid and ester forming derivatives thereof. Examples of aromatic dithiols may include benzene-1,4-dithiol, benzene-1,3-dithiol, 2,6-naphthalane-dithiol, 2,7-naphthalene-dithiol and ester forming derivatives thereof. Examples of aromatic mercaptophenols may include 4-mercaptophenol, 3-mercaptophenol, 6-mercaptophenol, 7-mercaptophenol and ester forming derivatives thereof.

The preferred liquid crystalline polyester resins are those having basic monomer constitutes as follows:

2,6-naphthalene dicarboxylic acid/4-hydroxybenzoic acid/hydroquinone copolymer;

2,6-naphthalene dicarboxylic acid/4-hydroxybenzoic acid/4,4'-dihydroxybiphenyl copolymer;

2,6-naphthalene dicarboxylic acid/4-hydroxybenzoic acid/2,6-dihydroxynaphthalene copolymer;

2,6-naphthalene dicarboxylic acid/4-hydroxybenzoic acid/4,4'-dihydroxybiphenyl ether copolymer;

2,6-naphthalene dicarboxylic acid/4-hydroxybenzoic acid/ethylene glycol copolymer;

2,6-naphthalene dicarboxylic acid/4-hydroxybenzoic acid/bis(4-hydroxyphenyl)ethane copolymer;

2,6-naphthalene dicarboxylic acid/4-hydroxybenzoic acid/2-hydroxy-6-naphthoic acid/hydroquinone copolymer;

2,6-naphthalene dicarboxylic acid/2-hydroxy-6-naphthoic acid/4,4'-dihydroxybiphenyl copolymer;

2,6-naphthalene dicarboxylic acid/2-hydroxy-6-naphthoic acid/2,6-dihydroxynaphthalene copolymer;

2,6-naphthalene dicarboxylic acid/2-hydroxy-6-naphthoic acid/4,4'-dihydroxybiphenyl ether copolymer;

2,6-naphthalene dicarboxylic acid/2-hydroxy-6-naphthoic acid/ethylene glycol copolymer;

2,6-naphthalene dicarboxylic acid/2-hydroxy-6-naphthoic acid/bis(4-hydroxyphenyl)ethane copolymer;

2,6-naphthalene dicarboxylic acid/2-hydroxy-6-naphthoic acid/hydroquinone copolymer;

2,6-naphthalene dicarboxylic acid/4-hydroxy benzoic acid/2-hydroxy-6-in a naphthoic acid/4,4'-dihydroxybiphenyl copolymer;

2,6-naphthalene dicarboxylic acid/4-hydroxy benzoic acid/2-hydroxy-6-naphthoic acid/2,6-dihydroxynaphthalene copolymer;

2,6-naphthalene dicarboxylic acid/4-hydroxy benzoic acid/2-hydroxy-6-naphthoic acid/4,4'-dihydroxybiphenyl ether copolymer;

2,6-naphthalene dicarboxylic acid/4-hydroxy benzoic acid/2-hydroxy-6-naphthoic acid/ethylene glycol copolymer and 2,6-naphthalene dicarboxylic acid/4-hydroxy benzoic acid/2-hydroxy-6-naphthoic acid/bis(4-hydroxyphenyl) ethane copolymer.

Preferred examples of liquid crystalline polyester resin of the present invention are those comprising repeat units (I) and (II) and at least one repeat unit selected from (III) and (IV) as their principal repeat units.

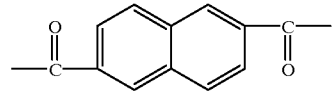

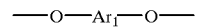

wherein $Ar_1$ represents a ring moiety selected from the group consisting of benzene, naphthalene, biphenyl, biphenyl ether and biphenyl alkane rings wherein the alkane moiety has 1–4 carbon atoms. The ring moiety may be substituted by alkyl group, alkoxy group, or halogen atom.

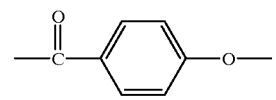

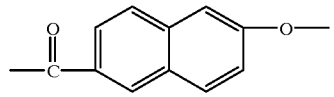

The repeat unit (I) may be introduced by means of 2,6-naphthalene dicarboxylic acid. More preferably, the aromatic dicarboxylic acid composition of the present invention which comprises 2,6-naphthalene dicarboxylic acid as the aromatic dicarboxylic acid component is preferably used for preparation of the liquid crystalline polyester resin.

The repeat unit (II) may be introduced by means of hydroquinone, 4,4'-dihydroxybiphenyl, 2,6-dihydroxynaphthalene, 4,4'-dihydroxybiphenylether, bis(4-hydroxyphenyl)alkane wherein the alkane moiety has 1–4 carbon atoms, and especially from hydroquinone and 4,4'-dihydroxybiphenyl.

The preferable molar ratio of (I):(II) in the liquid crystalline polyester resin of the present invention is substantially 1:1.

The preferable molar ratio of the total of (I) and (II) to the total of (III) and (IV) is from 10:90 to 70:30, preferably, from 25:75 to 50:50. The molar ratio of (III):(IV) may be from 0:100 to 100:0, preferably from 1:99 to 99:1.

The liquid crystalline polyester resin may be prepared easily from the aromatic dicarboxylic acid composition of the present invention comprising at least one aromatic dicarboxylic acid; a certain amount of at least one compound selected from the group consisting of 6-formyl-2-naphthoic acid, 6-methoxycarbonyl-2-naphthoic acid, and trimellitic acid; a certain amount of an alkali metal and optionally a certain amount of transition metal, and LCP constituting monomers other than the aromatic dicarboxylic acid. Alternatively, the liquid crystalline polyester resin of the present invention may be prepared by adding at least one compound selected from the group consisting of 6-formyl-2-naphthoic acid, 6-methoxycarbonyl-2-naphthoic acid, and trimellitic acid; an alkali metal and optionally a transition metal to any of the above described monomer components or to the mixture thereof before or during the polymerization of the liquid crystalline polyester.

The liquid crystalline polyester resin of the present invention may be prepared by any method known in the art, for example, by a known polycondensation method such as molten acidlysis or slurry polymerization method from the aromatic dicarboxylic acid composition of the present invention and other monomers described as above.

The molten acidlysis method is preferably used in the present invention. In this method, the monomers are heated together to give molten solution and subsequently reacted to give molten polymer. In order to facilitate the removal of volatile materials (ex. acetic acid or water) occurs at the final stage of the condensation reaction, the reaction may be carried out under vacuum.

The slurry polymerization method is characterized in that monomers are reacted in a heatexchange fluid to give solid polymer in the form of suspension in the fluid.

In either of the molten acidlysis method or the slurry polymerization method, the monomers having hydroxyl group may be added or reacted in the form of lower acyl esters (at room temperature). The lower acyl group may be those having 2–5, preferably 2 or 3 carbon atoms. Especially, the monomer component may be subjected to the reaction in the form of acetate. In this embodiment, the hydroxy group of the monomer may be esterified separately and added to the reaction. Alternatively, an acylating agent such as acetic anhydrous may be admixed with the reaction mixture to generate the ester in the reaction.

In either of the molten acidlysis method or the slurry polymerization method, catalysts may optionally be added to the reaction.

Examples of the catalysts include organic tin compounds such as dialkyl tin oxide (ex. dibutyl tin oxide) and diaryl tin oxide; organic titanium compounds such as titanium dioxide, alkoxy titanium silicate and titanium alkoxide; antimony trioxide; alkali or alkaline earth metal salt of carboxylic acid such as potassium acetate, sodium acetate and zinc acetate; and gaseous acid catalysts such as Lewis acid (ex. $BF_3$) and halogenated hydrogen (ex. HCl).

The amount of the catalyst added to the reaction may be 10–1000 ppm, preferably 20–200 ppm based on the total amount of the monomers in the reaction.

The liquid crystalline polyester resin of the present invention is preferably be those of which logarithmic viscosity number in pentafluorophenol can be determined. Said logarithmic viscosity number at 0.1 g/dl and 60° C. may preferably be more than 0.3 dl/g, and preferably 0.5–10 dl/g and more preferably, 1–8 dl/g.

The melt viscosity of the liquid crystalline polyester resin measured with capillary rheometer is preferably 1–1000 pa·s and more preferably 50–300 Pa·s.

The liquid crystalline polyester resin of the present invention may be admixed with, if desired, one or more fillers and/or reinforcing agents of fibrous, lamellar or particulate materials.

Examples of the fillers and/or reinforcing agents of fibrous materials include glass fiber, silica-alumina fiber, alumina fiber, carbon fiber and aramid fiber. Among them, glass fiber is preferably used.

Examples of lamellar or particulate fillers include talc, mica, graphite, wollastonite, calcium carbonate, dolomite, clay, glass flakes, glass beads, barium sulfate and titanium oxide.

The fillers and/or reinforcing agents may be used solely or in combination of the two or more. The amount of the fillers and/or reinforcing agents of fibrous, lamellar or particulate materials to be added to 100 parts by weight of the liquid crystalline polyester resin may be 0–100 parts by weight, preferably 20–70 parts by weight.

The liquid crystalline polyester resin of the present invention may optionally be admixed with a mold-release agent such as higher fatty acid, higher fatty acid ester, higher fatty acid amide, metal salt of higher fatty acid, polysiloxane and fluoride resin; and one or more conventional additives for example colorant such as dyes and pigments; antioxidant; thermal stabilizer; UV absorbent; antistatic agent and surface active agent.

Polymer pellets of the liquid crystalline polyester resin of the present invention may be admixed with lubricating agent such as higher fatty acid, higher fatty acid ester, metal salt of higher fatty acid, polysiloxane and fluoride resin prior to molding the composition so that said agent covers the surface of the pellets.

The liquid crystalline polyester resin of the present invention may further be blended with one or more other resin components such as polyamide, polyester, polyphenylenesulfide, polyether ketone, polycarbonate, polyphenyleneether and modified compounds thereof, thermoplastic resins such as polysulfone, polyethersulfone and polyetherimide; thermosetting resins such as phenol resin, epoxy resin and polyimide resin.

The above filler, reinforcing agent and other resin components may be fed with the liquid crystalline polyester resin in a kneading machine such as Banbury mixer, kneader, single screw extruder, twin screw extruder or the like and kneaded at a temperature between the melting point of the polyester resin and the melting point +100° C. to give polymer composition to be molded.

Thus obtainable liquid crystalline polyester resin and resin composition comprising the same may be molded by means of known method such as injection, compression, extrusion and blow molding. Thus obtainable molded articles, films and fibers are applied in a variety of field including electric and electronic devices, machines, motor vehicles and more.

EXAMPLES

The following examples are merely to aid in the understanding of the invention, and it is to be understood that they are not to be construed to limit the scope of the invention.
Additives Used in the Examples:

FNA: 6-formyl-2-naphthoic acid
TMA: trimellitic acid
6MNA: 6-methoxycarbonyl-2-naphthoic acid.

Preparation of the LCPs:
In the following Examples and Comparative Examples, two liquid crystalline polyester resins comprising the additives specified in table 1 were prepared:

LCP-1: 58/21/21 (mol %) of 4-hydroxy benzoic acid/hydroquinone/2,6-naphthalene dicarboxylic acid
LCP-2: 65/5/15/15 (mol %) of 4-hydroxy benzoic acid/2-hydroxy-6-naphthoic acid/hydroquinone/2,6-naphthalene dicarboxylic acid The contents of alkali metal and transition metal in the starting monomers used in the examples were less than 1 ppm (measured by atomic absorption spectro photometry). The contents of 6-formyl-2-naphthoic acid, 6-methoxycarbonyl-2-naphthoic acid and trimellitic acid in starting the 2,6-naphthalene dicarboxylic acid were below the detection limit of the gas chromatography determination.

In the examples and comparative examples, additives shown in the table 1 were added to 2,6-naphthalene dicarboxylic acid and mixed uniformly to give the aromatic dicarboxylic acid composition. Thus obtained aromatic dicarboxylic acid composition and the other monomers of the above LCP-1 or LCP-2 were charged into a reaction vessel in the ratio defined as above so that the total monomer amount was 7.5 mol. The reaction vessel used herein was those equipped with an agitating means having a torquemeter and a flush tube. 1.025 times molar amount the total monomers of acetic unhydride was added thereto. The mixture was heated to 150° C. and kept at the temperature for 30 minutes under nitrogen atmosphere. Then the reaction was heated quickly to 190° C. and kept at the temperature for 1 hour, during which time acetic acid by-product was removed. After that, the reaction was heated to 360° C. over Color Evaluation The $L^*$, $a^*$ and $b^*$ values of thus obtained test strip were determined by means of spectrophotometer (Machbeth Color-Eye 7000, Sakata Inx Corporation, Osaka Japan). The $L^*$ value represents the brightness of the sample and smaller $L^*$ value means the strip was colored well in black.

Izod Impact Test

Izod impact test was carried out on the test specimens according to ASTM D256.

Results are summarized in the table 1.

|  | Example | | | | | Comparative Example | | | | |
|---|---|---|---|---|---|---|---|---|---|---|
|  | 1 LCP-1 | 2 LCP-1 | 3 LCP-1 | 4 LCP-2 | 5 LCP-2 | 1 LCP-1 | 2 LCP-1 | 3 LCP-1 | 4 LCP-1 | 5 LCP-2 |
| Amount in the composition | | | | | | | | | | |
| FNA (ppm) | 9 | — | — | 12 | 12 | — | 9 | 15500 | — | — |
| 6 MNA (ppm) | — | 9 | — | — | — | — | 9 | 7600 | — | 29800 |
| TMA (ppm) | — | — | 12 | 1940 | — | — | — | — | 12 | — |
| K (ppm) | 58 | 58 | 58 | 80 | 80 | 58 | — | 58 | — | 80 |
| Co (ppm) | — | — | 860 | — | 36 | 1000 | — | — | 10200 | 140 |
| Amount in the LCP | | | | | | | | | | |
| FNA (mmol %) | 0.20 | — | — | 0.20 | 0.20 | — | 0.20 | 350 | — | — |
| 6 MNA (mmol %) | — | 0.18 | — | — | — | — | 0.18 | 150 | — | 420 |
| TMA (mmol %) | — | — | 0.25 | 30.0 | — | — | — | — | 0.25 | — |
| K (ppm) | 21 | 18 | 20 | 21 | 20 | 19 | 0.5 | 20 | 0.7 | 22 |
| Co (ppm) | — | — | 299 | — | 9 | 351 | — | — | 3554 | 36 |
| Properties | | | | | | | | | | |
| L* | 35 | 36 | 31 | 29 | 30 | 45 | 48 | 44 | 44 | 49 |
| Izod Impact (J/m) | 439 | 451 | 488 | 517 | 503 | 354 | 381 | 263 | 109 | 185 |

3.75 hours and then the pressure was reduced over the next about 30 minutes to 20 mmHg. When the torque was achieved to a predetermined amount, the reaction was terminated. The product was removed from the vessel and pulverized to give polymer pellets. The amount of the removed acetic acid was almost consisted with the calculated value.

Compounding of the LCP with a Black Colorant 100 parts by weight of the polymer pellets obtained as above were admixed with 1 part by weight of carbon black (Mitsubishi Carbon Black #45; Mitsubishi Chemical Corporation, Tokyo, Japan), molten and kneaded by means of twin screw extruder (PCM-30; Ikegai Corporation, Kanagawa, Japan). The mixture was pelletized by means of strand cutter.

Thus obtained compounded polymer pellets were molded into the test strip of 12.7×64×3.0 (mm) by means of injection molding machine MINIMAT 26/15 (Sumitomo Heavy Industries, Ltd. Tokyo, Japan) with cylinder temperature of 350–350–310–280° C. and mold temperature of 70° C.

What is claimed is:

1. An aromatic dicarboxylic acid composition, essentially consisting of
   (a) at least one aromatic dicarboxylic acid,
   (b) 1–3000 ppm of at least one compound selected from the group consisting of 6-formyl-2-naphthoic acid, 6-methoxycarbonyl-2-naphthoic acid and trimellitic acid,
   (c) 1–1000 ppm of at least one alkali metal and
   (d) 0–3000 ppm of at least one transition metal;
   wherein the alkali metal is selected from the group consisting of sodium and potassium;
   wherein the composition is used for preparation of a liquid crystalline resin composition.

2. The composition of claim 1, which comprises 1–3000 ppm of at least one transition metal.

3. The composition of claim 2, wherein the transition metal is selected from the group consisting of cobalt and manganese.

4. The composition of claim 2, wherein the transition metal is present in the form of a transition metal salt selected from the group consisting of sulfate, carbonate, bicarbonate, nitrate, carboxylate and haloid.

5. The composition of claim 4, wherein the mean volume particle size of the transition metal salt is about 0.01–500 μm.

6. The composition of claim 1, wherein the alkali metal is present in the form of an alkali metal salt selected from the group consisting of sulfate, carbonate, bicarbonate, nitrate, carboxylate and haloid.

7. The composition of claim 6, wherein the mean volume particle size of the alkali metal salt is about 0.01–500 μm.

8. The composition of claim 1, wherein the component (b) is 6-formyl-2-naphthoic acid.

9. The composition of claim 1, wherein the aromatic dicarboxylic acid is 2,6-naphthalene dicarboxylic acid.

10. The composition of claim 1, wherein the component (b) is 6-methoxycarbonyl-2-naphthoic acid.

11. A liquid crystalline polyester resin comprising
   (a) at least one repeat unit derived from an aromatic dicarboxylic acid;
   (b) at least one monomer unit derived from a compound selected from the group consisting of 6-formyl-2-naphthoic acid, 6-methoxycarbonyl-2-naphthoic acid and trimellitic acid in an amount of 0.1–100 mmol % based on the total monomer units constituting the polyester;
   (c) 1–1000 ppm of at least one alkali metal.

12. The liquid crystalline polyester resin of claim 11, further comprising 1–300 ppm of at least one transition metal.

13. A liquid crystalline polyester resin of claim 11, comprising the repeat units of (I), (II) and at least one of (III) and (IV) as its principal repeat units;

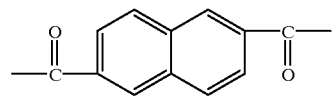

(I)

(II)

wherein $Ar_1$ represents a ring moiety selected from the group consisting of benzene, naphthalene, biphenyl, biphenyl ether and biphenyl alkane wherein the alkane moiety has 1–4 carbon atoms and said ring moiety may be substituted by alkyl, alkoxy, or halogen atom;

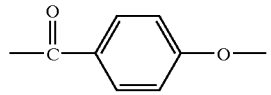

(III)

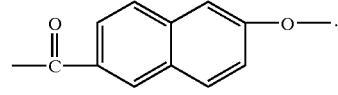

(IV)

14. The liquid crystalline polyester resin of claim 11, wherein the component (b) is 6-formyl-2-naphthoic acid.

15. The liquid crystalline polyester resin of claim 11, wherein the component (b) is 6-methoxycarbonyl-2-naphthoic acid.

* * * * *